United States Patent
Sato et al.

(10) Patent No.: US 6,928,100 B2
(45) Date of Patent: Aug. 9, 2005

(54) LASER DEVICE AND LENS POSITION ADJUSTMENT METHOD IN THE LASER DEVICE

(75) Inventors: Wataru Sato, Kanagawa (JP); Hisanori Kobayashi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/003,099

(22) Filed: Dec. 6, 2001

(65) Prior Publication Data

US 2002/0075916 A1 Jun. 20, 2002

(30) Foreign Application Priority Data

Dec. 6, 2000 (JP) ........................................ 2000-371394
Nov. 21, 2001 (JP) ........................................ 2001-356357

(51) Int. Cl.[7] .................................................. H01S 3/00
(52) U.S. Cl. ....................... 372/109; 372/101; 372/103; 359/719; 359/718
(58) Field of Search ........................... 372/109; 359/718, 359/719, 808, 811, 819; 362/259, 268, 335

(56) References Cited

U.S. PATENT DOCUMENTS

| | | | | |
|---|---|---|---|---|
| 4,702,576 A | * | 10/1987 | Magnante | 351/214 |
| 4,762,395 A | * | 8/1988 | Gordon et al. | 359/819 |
| 4,972,258 A | * | 11/1990 | Wolf et al. | 348/79 |
| 5,555,232 A | * | 9/1996 | Kobayashi et al. | 369/112.7 |
| 5,781,351 A | * | 7/1998 | Murakami et al. | 359/808 |
| 5,997,153 A | * | 12/1999 | Naoe et al. | 362/259 |
| 6,147,817 A | * | 11/2000 | Hashizume | 359/819 |
| 6,188,528 B1 | * | 2/2001 | Yamada et al. | 359/719 |
| 6,343,092 B1 | * | 1/2002 | Naoe et al. | 372/108 |
| 6,404,723 B1 | * | 6/2002 | Morishita | 369/112.23 |
| 6,472,651 B1 | * | 10/2002 | Ukai | 250/201.5 |
| 2002/0036839 A1 | * | 3/2002 | Kishima et al. | 359/819 |

FOREIGN PATENT DOCUMENTS

| | | |
|---|---|---|
| JP | 8-112940 | 5/1996 |
| JP | 9-218368 | 8/1997 |

* cited by examiner

Primary Examiner—Don Wong
Assistant Examiner—Dung Nguyen
(74) Attorney, Agent, or Firm—Fitzpatrick, Cella, Harper & Scinto

(57) ABSTRACT

A recess 14 is provided in a lens accommodating portion 13 of a laser holder 10 for holding a collimator lens C, whereby positional accuracy and adhesion strength of the lens and a light source are improved.

15 Claims, 15 Drawing Sheets

LASER DEVICE AND LENS POSITION ADJUSTMENT METHOD IN THE LASER DEVICE

BACKGROUND OF THE INVENTION

1. Field of the Invention

The present invention relates to a laser device to be applied to an image forming apparatus such as a laser beam printer, a laser facsimile and a copying machine and, more specifically, to a position adjustment of a lens in the laser device.

2. Description of the Related Art

Conventionally, as a form of a light source device composed of a light source using a semiconductor laser of this type and a collimator lens for focusing a laser beam in a predetermined spot shape, there is, for example, a conventional device using an optical element in which a collimator lens portion and a lens holder portion are integrally formed with a part of the optical element being fixed by an adhesive to a holding member of the semiconductor laser.

In addition, Japanese Patent Application Laid-open No. Hei 8-112940 discloses a light source device in which a collimator lens C is held on a lens holder 400 by a method such as adhesion and a part of this lens holder 400 is fixed to a holding member 100 of a semiconductor laser by an adhesive W, as shown in FIG. 21.

Moreover, Japanese Patent Application Laid-open No. Hei 9-218368 discloses an example of a configuration in which a collimator lens C is directly fixed to only one surface of a holding member 110 of a semiconductor laser S by the adhesive W, as shown in FIG. 22.

However, in the case of the above-mentioned conventional art, there are problems as described below.

According to the above-mentioned conventional example using an optical element in which a collimator lens portion and a lens holder portion are integrally formed, there are restrictions in that, for example, the optical element must be composed of a molded product such as glass or a resin in selecting a material suitable for properties of both the collimator lens portion and the lens holder portion to which the collimator lens portion adheres to. In addition, costs are increased in comparison with a lens manufactured by machining because a molded product is used.

In addition, in the configuration shown in Japanese Patent Application Laid-open No. Hei 8-112940 (see FIG. 21), extremely high machining accuracy is required for a portion for fixing a lens holder, which is a holding portion of a collimator lens, and a holding member of a semiconductor laser in order to adjust the semiconductor laser and the collimator lens with high accuracy. Further, a user should be attentive to an adjustment of an entire light source device due to component accuracy of a lens holder and assembly accuracy of a collimator lens.

Further, in the configuration shown in Japanese Patent Application Laid-open No. Hei 9-218368 (see FIG. 22) rigidity of a lens holding member tends to decrease and there is also concern about deterioration of performance due to excited vibration in an optical system with a wide interval between a semiconductor laser and a collimator lens. In addition, there is a problem in that holding strength also decreases because an adhesive part of a collimator lens is limited.

SUMMARY OF THE INVENTION

The present invention has been made in view of the above and other drawbacks, and it is therefore an object of the present invention to provide a laser device, a laser scanning device and an image forming apparatus in which positional accuracy of a lens and a light source is improved while maintaining holding strength of the lens and a position adjustment method of a lens in the laser device.

It is another object of the present invention to provide a laser device, a laser scanning device and an image forming apparatus in which a lens can be fixed directly to a holding member for holding a light source and a position adjustment method of a lens in the laser device.

It is another object of the present invention to provide a laser device, a laser scanning device and an image forming apparatus comprising: a light source for emitting a laser beam; a lens through which the laser beam emitted from the light source is transmitted; and a holder having a tubular portion for holding the light source and the lens, in which the internal surface of the tubular portion has a recess in a position in which the lens is held. It is another object of the present invention to provide a lens position adjustment method in a laser device comprising the steps of: fixing a light source emitting a laser beam to a holder having a tubular portion; supporting a lens with supporting members, positioning the supporting members in recesses provided in the tubular portion and adjusting relative positions of the lens and the light source; and fixing the lens in a fixing part of the tubular portion.

It is another object of the present invention to provide a laser device, a laser scanning device and an image forming apparatus comprising: a light source for emitting a laser beam; a lens through which the laser beam emitted from the light source is transmitted; a holder having a tubular portion for holding the light source and the lens; and first and second recessed portions which are provided in the tubular portion and are open toward the end portion of the tubular portion on the opposite side of the light source across the position of the lens, in which the second recessed portion is shorter than the first recessed portion with respect to the optical axis direction of the lens.

It is another object of the present invention to provide a laser device, a laser scanning device and an image forming apparatus comprising: a light source for emitting a laser beam; a lens through which the laser beam emitted from the light source is transmitted; a holder having a tubular portion for holding the light source and the lens; first recessed portion for supporting the lens, which are provided in the tubular portion and are open toward the end portion of the tubular portion on the opposite side of the light source across the position of the lens; and second recessed portion for pouring adhesive into the part between the lens and the tubular portion, which are provided in the tubular portion and are open toward the end portion of the tubular portion on the opposite side of the light source across the position of the lens.

It is yet another object of the present invention to provide a lens position adjustment method in a laser device comprising the steps of: fixing a light source emitting a laser beam to a holder having a tubular portion; supporting a lens with supporting members, positioning the supporting members in first recessed portion provided in the tubular portion and adjusting the relative positions of the lens and the light source; and pouring adhesive from second recessed portion provided in the tubular portion to fix the lens in a fixing part of the tubular portion.

Further objects of the present invention will be apparent from the following descriptions.

DETAILED DESCRIPTION OF THE PREFERRED EMBODIMENTS

Preferred embodiments of the present invention will be hereinafter described illustratively in detail with reference to drawings. However, dimensions, materials and shapes of components described in the embodiments and relative arrangements thereof are not construed to limit the scope of the present invention only to them.

Figure 13:
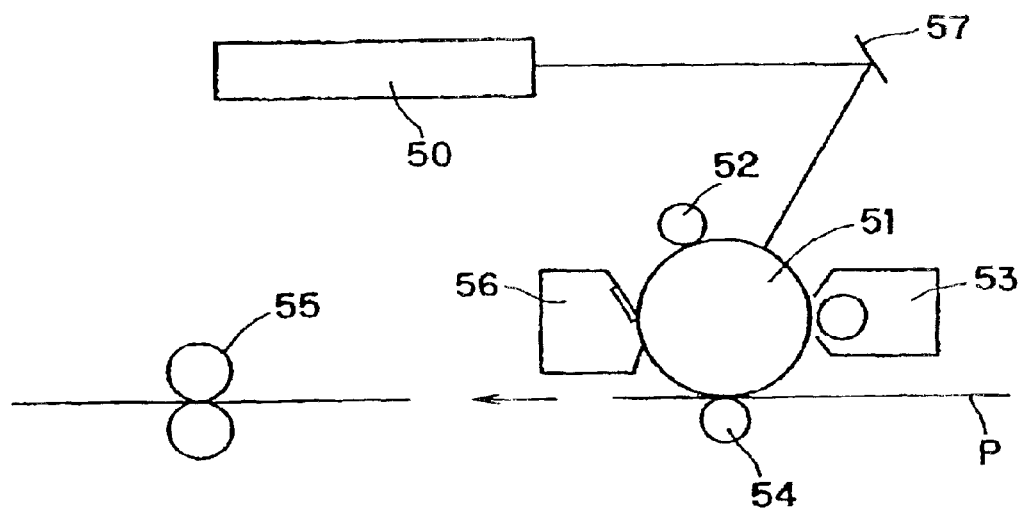
FIG. 13 is a view showing an image forming apparatus to which the present invention is applied.

FIG. 13 is a schematic view of an image forming apparatus to which the present invention is applied.

In FIG. 13, reference numeral 50 denotes a laser scanning device, 51 denotes a photosensitive drum, 52 denotes charging means, 53 denotes developing means, 54 denotes transferring means, 55 denotes fixing means, 56 denotes cleaning means and 57 denotes a mirror.

The photosensitive drum 51 charged by the charging means 52 is scanned by a laser beam irradiated from the laser scanning device 50 via the mirror 57 and an electrostatic latent image is formed on the photosensitive drum. The electrostatic latent image on the photosensitive drum 51 is developed by the developing means 53 and a toner image is formed on the photosensitive drum 51. The toner image on the photosensitive drum 51 is transferred on a recording material R by the transferring means 54 and the recording material R is carried to the fixing means 55 and the toner image is fixed on the recording material R.

Residual toner on the photosensitive drum 51 is cleaned by the cleaning means 56.

Figure 14:
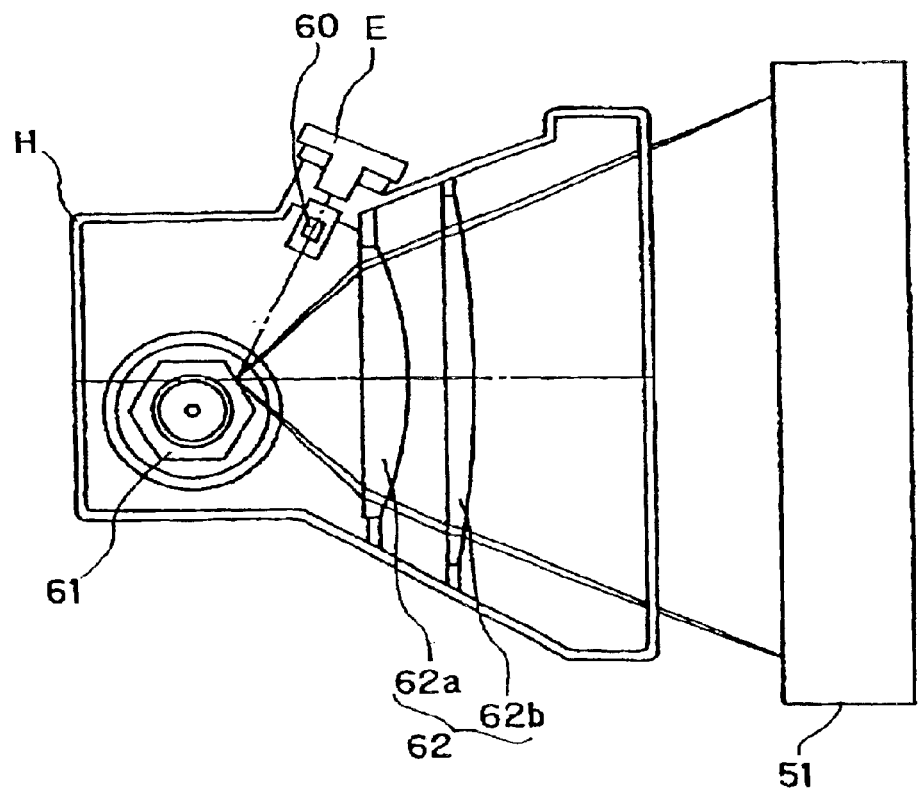
FIG. 14 is a view showing a laser scanning device of FIG. 13.

FIG. 14 illustrates the laser scanning device of FIG. 13.

In FIG. 14, the laser scanning device is housed in an optical box H. The laser scanning device is composed of a laser device E, a cylindrical lens 60 for gathering laser beams emitted from the laser device E into a linear shape, a rotary polygon mirror 61 that is deflecting means for performing scanning by deflecting the laser beams gathered by the cylindrical lens 60, a fθ lens 62 that is imaging means for imaging the laser beam deflected by the rotary polygon mirror 61 on the photosensitive drum, and the like.

The fθ lens 62 is designed such that laser beams are gathered to form a spot on the photosensitive drum 51 and a scanning speed of this spot is kept constant. In order to obtain such a property of the fθ lens 62, the fθ lens 62 is composed of two lenses, namely, a spherical surface lens 62a and a toric lens 62b.

As the rotary polygon mirror 61 rotates, main scanning by a laser beam is performed on the photosensitive drum 51. In addition, as the photosensitive drum 51 is driven to rotate about the axis of the cylinder, sub-scanning is performed.

Next, a laser device that is an embodiment of the present invention will be described based on FIGS. 1 to 12.

Figure 1:
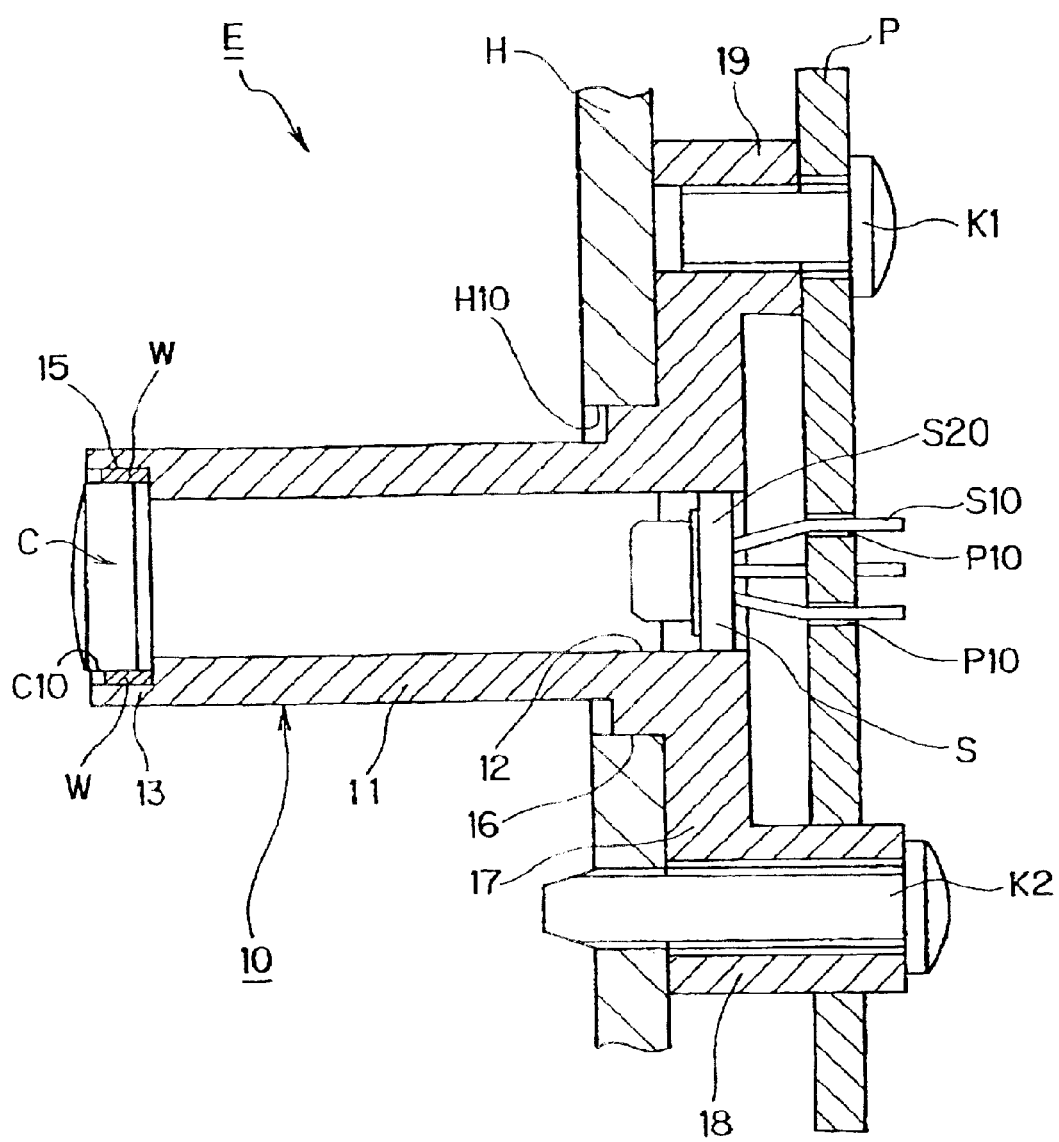
FIG. 1 is a view showing a laser device in accordance with an embodiment of the present invention.

FIG. 1 represents a characteristic of the present invention best and shows a schematic cross section of the laser device E.

Reference character S denotes a semiconductor laser that is a light source having a plurality of light-emitting points (not shown), S10 denotes lead pins, S20 denotes a substantially disc-shaped stem, P denotes a circuit substrate having an IC (not shown) for driving the semiconductor laser S, P10 denotes mounting holes for the lead pins S10 and 10 denotes a laser holder that is holding means for holding the semiconductor laser S.

In the laser holder 10, reference numeral 11 denotes a cylindrical portion that is a tubular portion inside of which becomes an optical path of a laser beam, 12 denotes a press-inserting hole for holding the semiconductor laser S at one end of the internal circumference portion of the cylindrical portion 11, 13 denotes a lens accommodating portion provided in the tip portion on the opposite side of the press-inserting hole 12 of the cylindrical portion 11, 14 denotes notches of a shape recessed as recesses in the tip direction of the tubular axis (see FIGS. 2 and 3), 15 denotes adhesive portions that are fixing portions for fixing a collimator lens C (described later) to the laser holder 10, 16 denotes a ring portion provided on the semiconductor laser S side of the cylindrical portion 11, which is in mating relationship with a mating hole H10 of the optical box H, 17 denotes a flange provided on the semiconductor laser S side of the cylindrical portion 11, 18 denotes an optical box mounting portion for fixing the laser device E and the optical box H with a screw K2 and 19 denotes a circuit substrate attaching portion for fixing the circuit substrate P to the laser holder 10 with a screw K1 in order to connect the circuit substrate P and the semiconductor laser S.

In addition, reference character C denotes a collimator lens for making laser beams emitted from the semiconductor laser S substantially parallel, C10 denotes an external circumference surface to be an adhesive part with the laser holder 10, T denotes chucks that are supporting means for performing a position adjustment in the axis (X, Y and Z axes) directions while gripping the collimator lens C (see FIGS. 4 and 5) and W denotes UV-curing type adhesive to be used for adhesive fixing of the collimator lens C in the adhesive portions 15.

The semiconductor laser S is directly pressed in the press-inserting hole 12 of the cylindrical portion 11 of the laser holder 10 to be fixedly held. The circuit substrate P is screwed to the laser holder 10 with the screw K1 with the lead pins S10 penetrating through the holes P10 provided in the circuit substrate P. Then, the lead pins S10 of the semiconductor laser S are soldered to the circuit substrate P.

On the other hand, a lens accommodating portion 13 is provided at the tip of the cylindrical portion 11 at the other end of the cylindrical portion 11 of the laser holder 10 on which the semiconductor laser S is fixedly held at one end. The lens accommodating portion 13 is for fixedly holding the collimator lens C.

Figure 2:
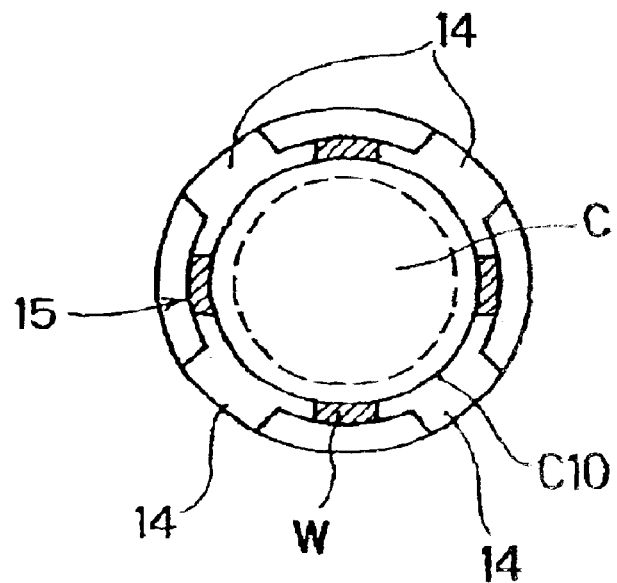
FIG. 2 is a front view from an optical axis direction of a lens accommodating portion.
Figure 3:
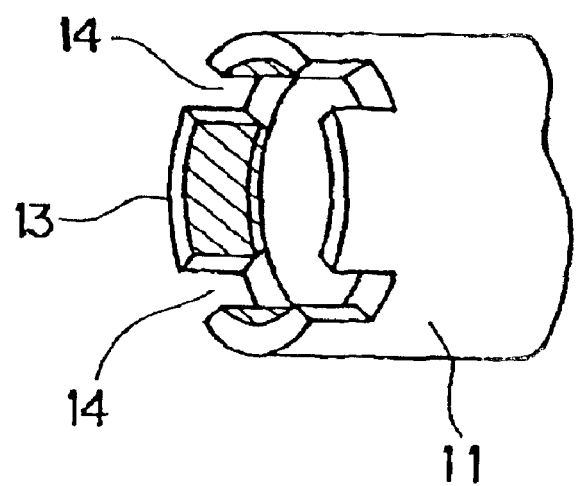
FIG. 3 is a perspective view of the lens accommodating portion.

As shown in FIGS. 2 and 3, recesses are provided in a position where the collimator lens C is held on the internal surface at the tip of the cylindrical portion 11 that is the lens accommodating portion 13. The recesses are bored through the cylindrical portion 11 from the internal surface to the external surface and are formed as notches 14 that are recessed portions which are open in the tip direction of a cylinder axis (optical axis of the collimator lens) in this embodiment. Although the notches 14 are provided in four parts on the circumference at the tip of the cylindrical portion 11 in this embodiment, the parts are not limited to four. They may be two or more and three or less, or five or more.

Figure 4:
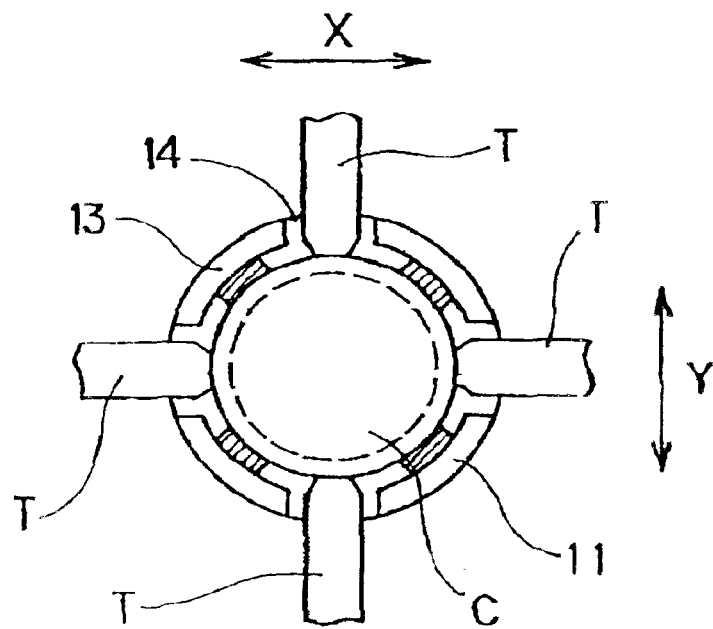
FIG. 4 illustrates an adhesive part of a lens and a position adjustment of the lens.

Reference character T shown in the notches 14 in FIG. 4 denotes chucks. The tips of the chucks T are inserted from the notches 14 and move in the axial direction while gripping the collimator lens C in each space of the notches 14, whereby a position adjustment of the collimator lens C is performed.

In addition, the notches 14 may not be bored through the cylindrical portion 11 from the internal surface to the external surface but may be provided as recesses only on the internal surface and, in this case, maybe cut in a recessed shape which is open in the tip direction of the cylindrical axis or may have a configuration in which the chucks T of the above-mentioned type, which is inserted from the external surface are not used.

The lens accommodating portion 13 has adhesive portions 15 for fixing the collimator lens C and the laser holder 10 in the inside of the tip of the cylindrical portion 11 using an UV-curing type adhesive W. The adhesive W in the adhesive portions 15 is applied to an area (corresponding to the shaded parts in FIGS. 3 and 4) excluding the parts where the notches 14 are formed on the circumference in order to avoid contact with the chucks T.

Figure 5:
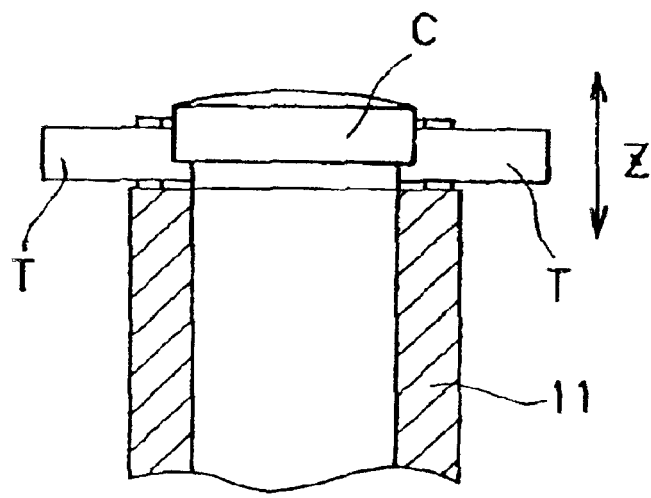
FIG. 5 illustrates a position adjustment of a lens.

As shown in FIGS. 4 and 5, a position adjustment of a laser beam of the semiconductor laser S and the collimator lens C is performed with the lens accommodating portion 13 of the lens holder 10 facing upward. The collimator lens C is gripped by the chucks T on its external circumference surface C10 and is contained in the lens accommodating portion 13 of the cylindrical portion 11. At this point, the chucks T are in the positions of the notches 14 of the cylindrical portion 11 and the spaces of the notches 14 become areas where the chucks T is movable for a position adjustment of the semiconductor laser S and the collimator lens C. Note that, the adhesive is applied to the internal surface of the laser holder 10 in advance before the collimator lens C is inserted in the laser holder 10.

Optical axis alignment of the laser beam of the semiconductor laser S and the collimator lens C is carried out by their movement in the X and Y directions and focusing of them is adjusted by their movement in the Z direction. The position adjustment may be performed by the movement of any one of the collimator lens C and the laser holder 10 or both of them.

Figure 6:
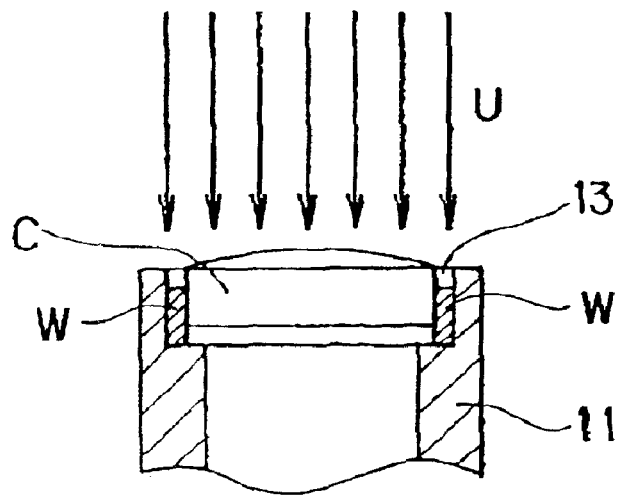
FIG. 6 illustrates an adhesion process of a lens.

As shown in FIG. 6, the UV-curing type adhesive W applied to the adhesive portions 15 is cured by irradiation of a ultraviolet ray U from the optical axis direction on the lens surface of the collimator lens C after completing each position adjustment. Then, the collimator lens C is fixed by an adhesive to the laser holder 10. The chucks T are removed after the adhesive W is cured.

That is, the semiconductor laser S emitting a laser beam is fixed to the laser holder 10 having the cylindrical portion 11, the collimator lens C is supported by the chucks T, the supporting members are positioned in the notches 14 provided in the cylindrical portion 11, the relative positions of the collimator lens C and the semiconductor laser S are adjusted, the collimator lens C is fixed to the fixing part of the cylindrical portion 11 with adhesive and then the chucks T are removed, whereby the position adjustment and assembling of the collimator lens C in the laser device are performed.

In this way, portions which are to be supported by the chucks T and the adhesive portions of the collimator lens C are separated and the adhesive can be cured by irradiation of the ultraviolet ray U from one direction through the lens surface. Thus, an adhesion process can be shortened and adhesive parts and the number of adhesive parts can be set arbitrarily. In addition, it is possible to increase adhesion strength.

In addition, since the notches 14 of the cylindrical portion 11 become the operating areas of the chucks T of the collimator lens C, degrees of freedom of the positions of the chucks T and the number of the chucks T increase, the collimator lens C can be supported surely and thus reliability is improved.

Further, since reliability in supporting the collimator lens C by the chucks T is increased, it is possible to make a special shape such as a thickened collimator lens unnecessary and to relax restrictions on a shape and design of a collimator lens.

Further, since the notches 14 at the tip of the cylindrical portion 11 are formed in a simple shape, it is possible to reduce costs by a configuration such as integral molding with the cylindrical portion main body.

Figure 7:
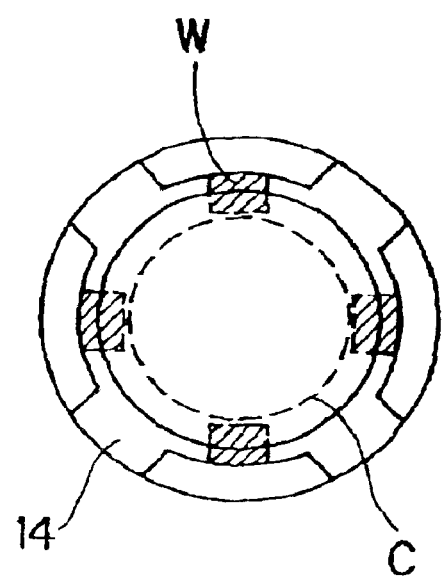
FIG. 7 is a front view from an optical axis direction showing another example of an adhesive part of a lens.
Figure 8:
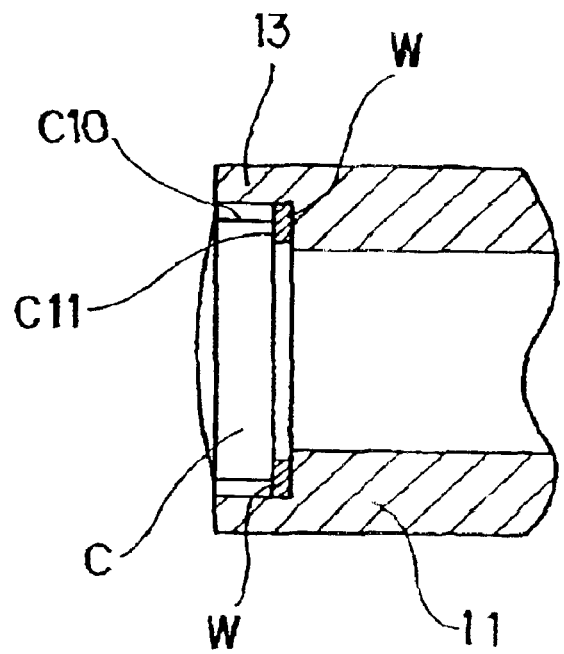
FIG. 8 is a side view of FIG. 7.
Figure 9:
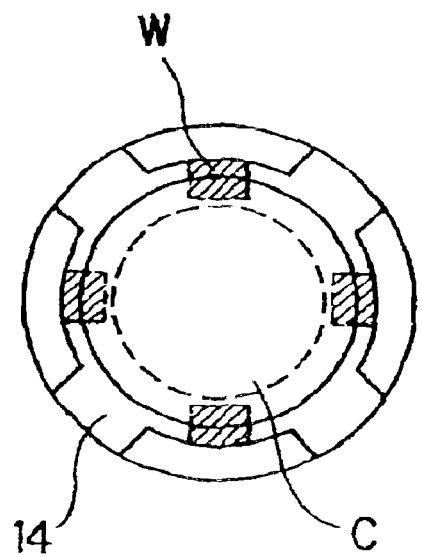
FIG. 9 is a front view from an optical axis direction showing another example of an adhesive part of a lens.
Figure 10:
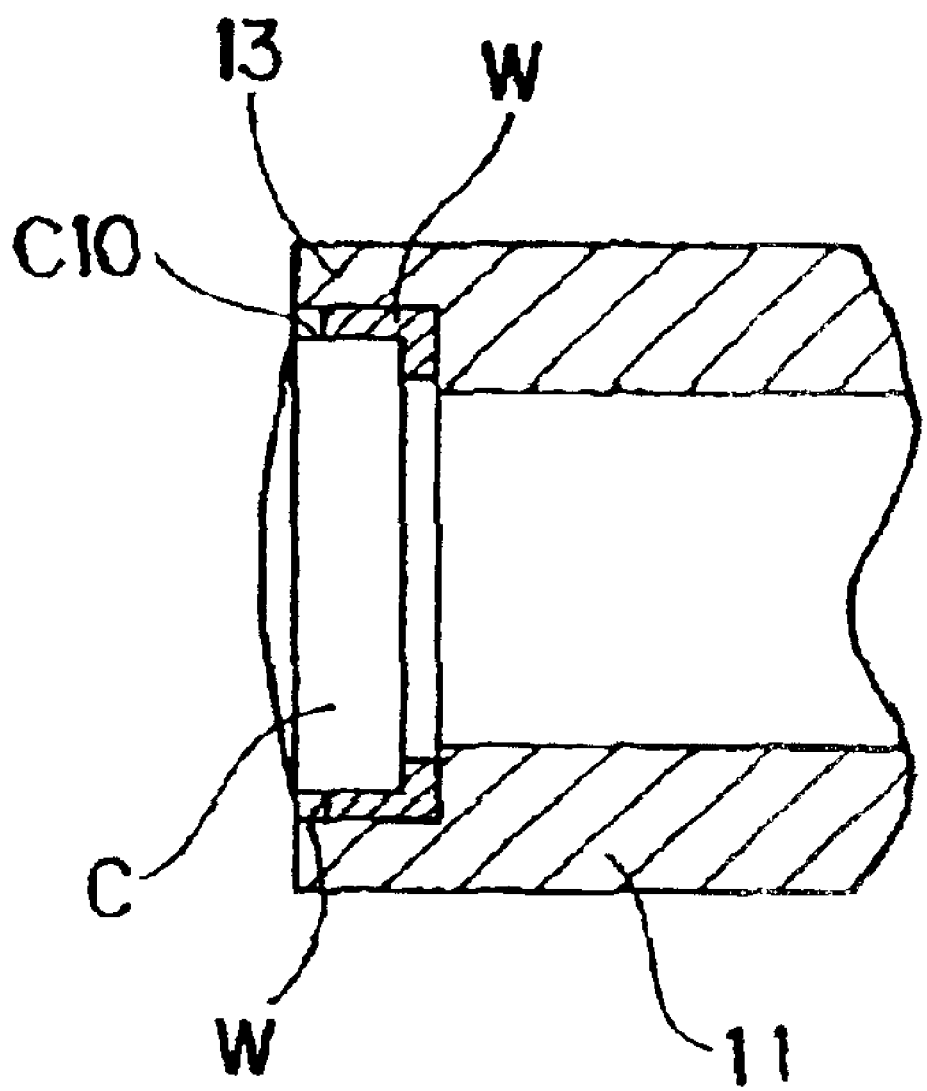
FIG. 10 is a side view of FIG. 9.

Note that although the external circumference surface C10 of the collimator lens C is an adhesive part in FIGS. 1 and 2, the laser beam incident surface of the collimator lens C may be an adhesive part as shown in FIGS. 7 and 8 or both the external circumference surface C10 and the laser beam incident surface of the collimator lens C may be adhesive parts as shown in FIGS. 9 and 10.

Since the adhesive portions 15 shown in FIGS. 1 and 2 and FIGS. 7 to 10 can be formed, the adhesive part of the collimator lens C is not limited but the collimator lens C can be fixed by an adhesive to a plurality of parts, whereby adhesive strength and holding strength can be enhanced.

Figure 11:
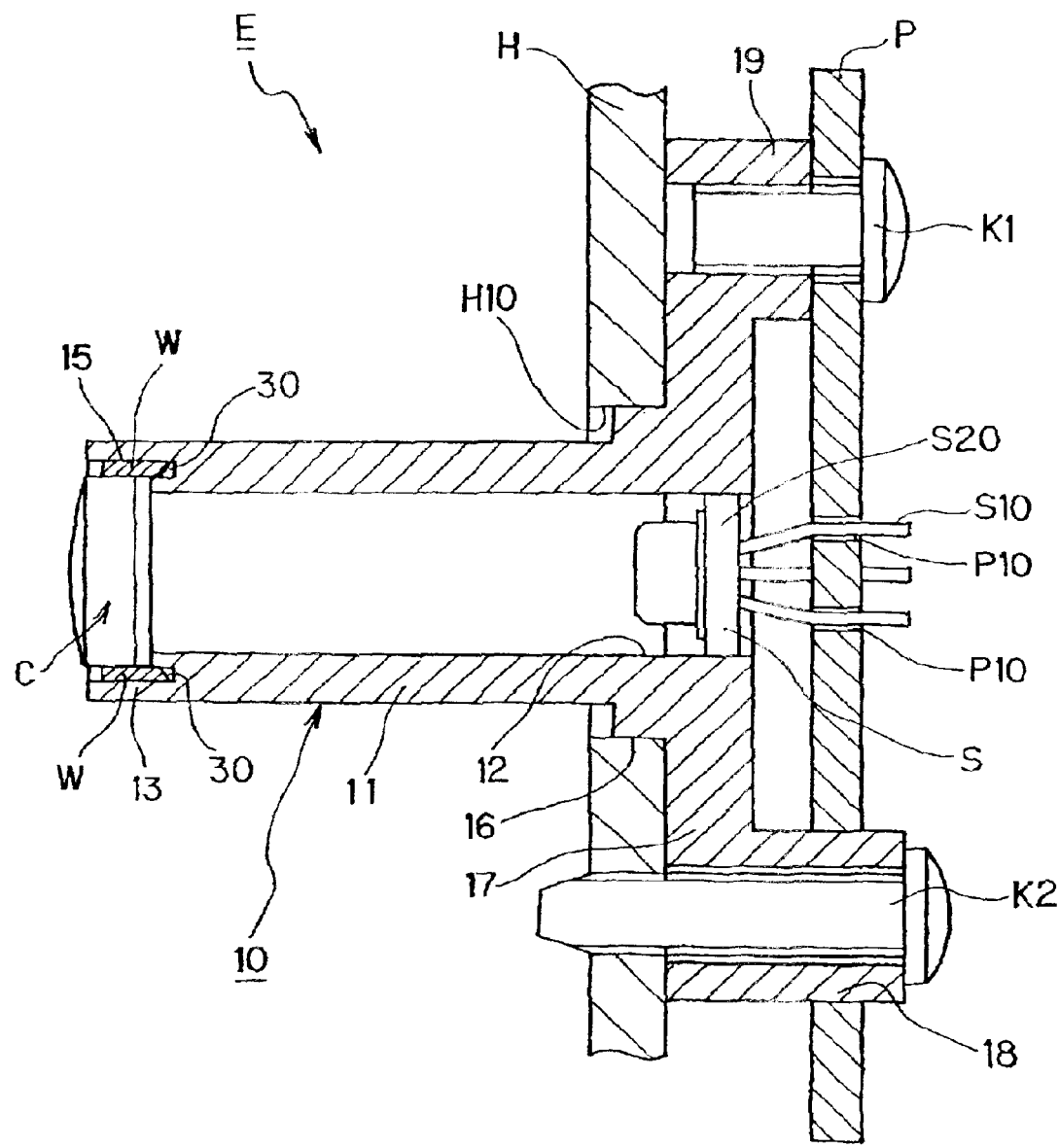
FIG. 11 is a view showing a laser device in accordance with another embodiment of the present invention.

A laser device E in accordance with another embodiment of the present invention is shown in FIG. 11. Reference numeral 30 denotes recesses continuously formed in the adhesive portions 15 in the lens accommodating portion 13, which are adhesive pooling portions recessed in the optical axis direction of the collimator lens C.

Configurations and adjusting and assembling methods of the components of the laser device other than the above-mentioned accommodating portion 13 are the same as those in the above-mentioned embodiment.

Figure 12:
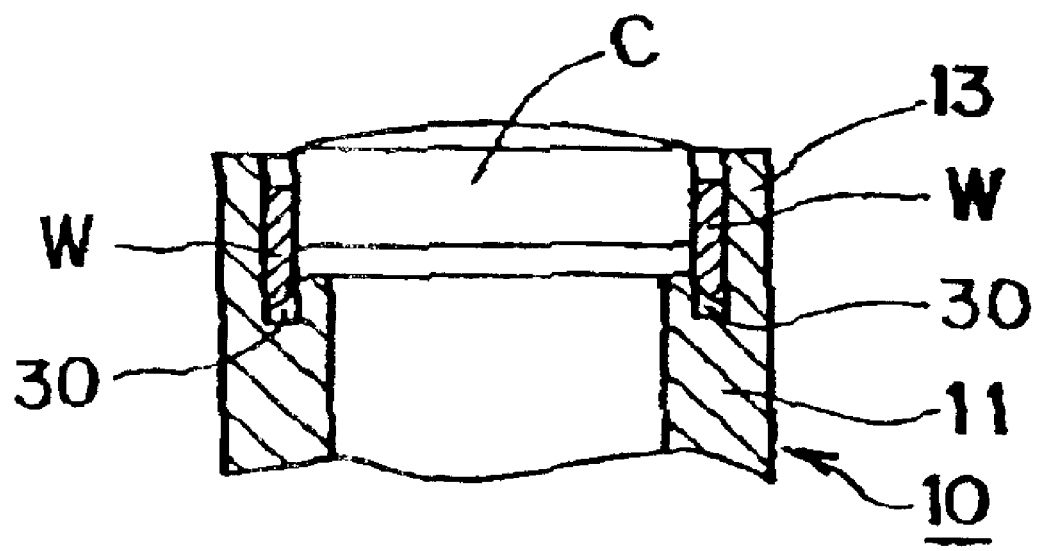
FIG. 12 is a side view of a lens accommodating portion.

As shown in FIG. 12, in the lens accommodating portion 13, UV-curing type adhesive is applied in advance with the lens accommodating portion 13 of the laser holder 10 facing upward at the time of position adjustment of the collimator lens C and the semiconductor laser S. At this time, adhesive pouring downward is contained in the recesses 30 of a groove shape. The adhesive contained in the recessed portions can also be cured by irradiation of an ultraviolet ray after completing the position adjustment.

It is sufficient that the recesses as the adhesive pooling portions are formed in a simple shape. The recesses may be formed by integral molding in advance or may be provided by cutting processing after molding. In addition, an assembly process can be shortened by applying adhesive in advance, whereby it becomes possible to reduce costs. Since adhesive before curing can be prevented from pouring into a laser optical path or an emitting portion of the semiconductor laser S, reliability can be improved with respect to an adhesion process and optical performance.

Further, although a cylindrical portion is described as an integrally formed one in the above-mentioned embodiment, it may be formed in a double structure consisting of an external cylinder and an internal cylinder. In this case, a step on the internal surface can be easily adjusted by adjusting the axial length of the internal cylinder.

Further, although the UV-curing type adhesive is used in the above-mentioned embodiment, photo-curing type adhesive other than the UV-curing type adhesive can also be used.

Further, adhesive is applied to the internal surface of the laser holder 10 in advance and the collimator lens C is inserted in the laser holder 10 thereafter in the above-mentioned embodiment. Alternatively, the collimator lens C may be inserted in the laser holder 10 to be subjected to position adjustment and adhesive may be applied to the part between the collimator lens C and the laser holder 10 thereafter.

As described above, according to the above-mentioned embodiment, since the collimator lens C can be directly fixed to a holding member of the semiconductor laser S without using a lens holding member or can be fixed by an adhesive to a plurality of parts, the member of components can be reduced and adjustment accuracy and adhesion strength can be improved. In addition, it is possible to realize shortening of an assembly process, costs reduction by saving of components and improvement of a degree of freedom of design and a highly reliable position adjustment method of a laser device and a collimator lens by improvement of adhesion strength.

Next, an embodiment of the present invention will be described in which a state of applying adhesive is stabilized and an area of adhesion is increased upon directly adhering a collimator lens to a laser holder holding a semiconductor laser, whereby adhesion strength is improved.

Figure 15A:
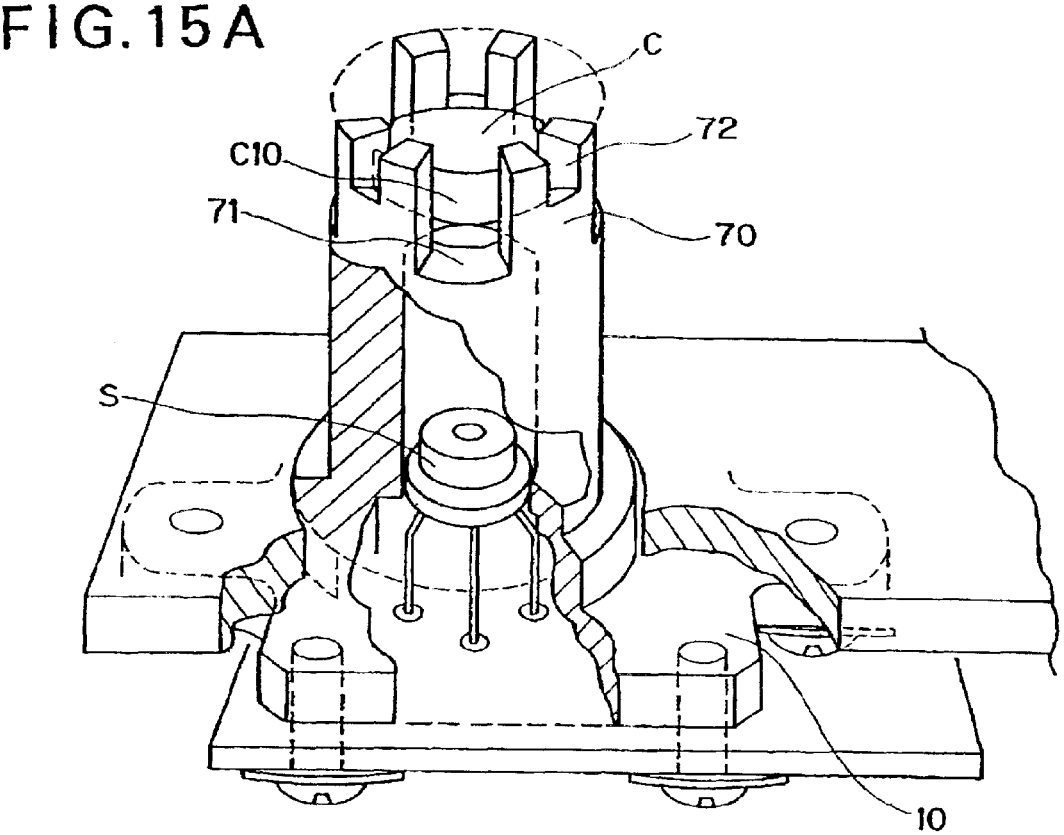
FIGS. 15A and 15B are views showing a laser device in accordance with another embodiment of the present invention.
Figure 15B:
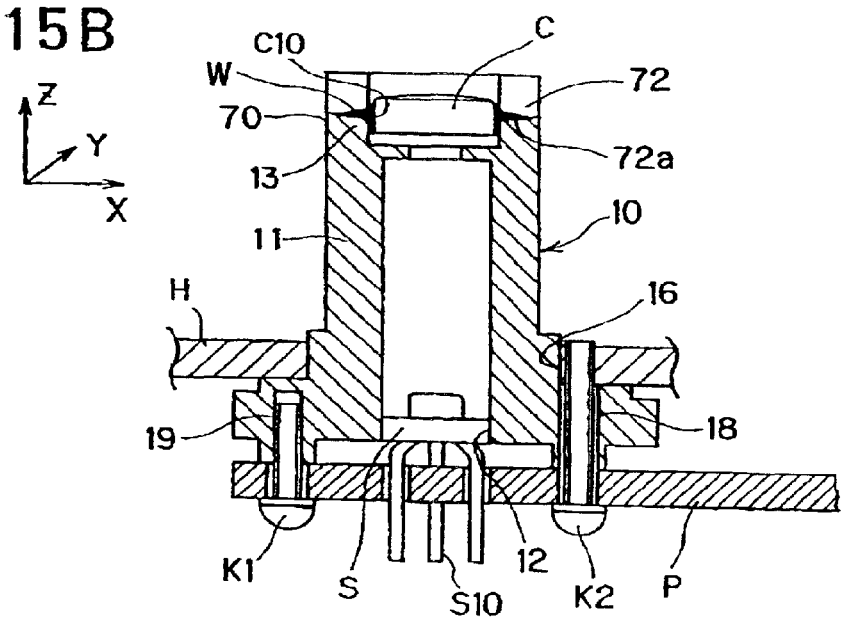

FIGS. 15A and 15B show a configuration of a laser device that is another embodiment of the present invention. FIG. 15A is a perspective view and FIG. 15B is a sectional view.

Reference character S denotes a semiconductor laser, reference numeral 10 denotes a laser holder for fixedly holding the semiconductor laser S, C denotes a collimator lens for forming laser beams substantially in parallel and P denotes a laser driving circuit substrate for causing the semiconductor laser S to emit light.

The laser holder 10 includes press-inserting holes 12 for holding the semiconductor laser S, a lens accommodating portion 13 of a cylindrical portion for holding the collimator lens C, a first notch 71 which is a first recessed portion to be areas where cramp tools Ta for holding the collimator lens C are movable, a protrusion 70 to be an adhesive part of the collimator lens C, a second notch 72 which is a second recessed portion provided with a taper portion (slanting portion) 72a for pouring UV-curing type adhesive W in engagement gaps between the collimator lens c and the protrusion 70, a mating portion 16 for mating the laser device E with a housing (optical box) H of a laser scanning device, a mounting portion 19 for screwing the laser driving circuit substrate P and a mounting portion 18 for screwing the integrally assembled laser device to the housing H.

That is, in this embodiment, the first and the second recessed portions are open toward the end of the cylindrical portion on the opposite side of the semiconductor laser S across the position of the collimator lens C. The second recessed portions are shorter than the first recessed portions with respect to the optical axis direction of the collimator lens C.

The collimator lens C is provided with an external circumference surface C10 that directly adheres to the laser holder 10.

In the above-mentioned configuration, the semiconductor laser S is pressed in and fixedly held in the press-inserting hole 12 of the laser holder 10. Lead pins S10 of the semiconductor laser S are soldered to the laser driving circuit substrate P. The laser driving circuit substrate P is screwed to the laser holder 10 by screws K1 and K2 and the laser holder 10 is screwed to the housing H by the screw K2.

The collimator lens C is held by the cramp tools Ta inserted from the first notches 71 with the lens adhesive portion of the laser holder 10 being in the vertical direction. The focal distance and the irradiating position of the collimator lens C are adjusted in predetermined positions in the three axial directions (X, Y and Z) with respect to a laser beam emitted from the semiconductor laser S.

At this time, the tip of the protrusion 70 extends beyond the emitting surface of the collimator lens C with respect to the adjusted position of the lens.

UV-curing type adhesive W is poured in the second notches 72 and pours into the engagement gaps between the laser holder 10 and the collimator lens C by its own weight and fills up the gaps. An adhesive is filled in the parts between the second notches 72 and the engagement portions, which are fixed by the adhesive with ultraviolet ray irradiated on them. The cramp tools Ta are removed after the lens is fixed by an adhesive. In this way, the integrated laser device is assembled.

That is, the semiconductor laser S emitting a laser beam is fixed to the laser holder 10 having the cylindrical portion, the collimator lens C is supported by the cramp tools Ta, the cramp tools are positioned in the first recessed portions provided in the cylindrical portion, the relative positions of the collimator lens C and the semiconductor laser S are adjusted, the adhesive is poured in from the second recessed portions provided in the cylindrical portion to fix the collimator lens C in the fixing part of the cylindrical portion and the cramp tools Ta are removed, whereby a position adjustment and assembling of the collimator lens in the laser device are performed.

Figure 16A:
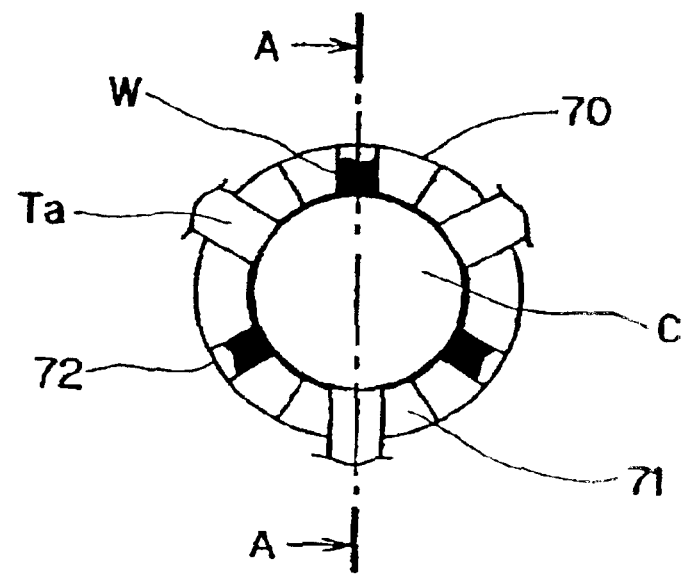
FIGS. 16A and 16B are views showing the periphery of a lens accommodating portion.

Although the second notches 72 are provided in three parts in the protrusion 70 in this embodiment as shown in FIGS. 15A, 15B, 18A and 18B, it is preferable that the number of the notches 72 is not limited and the notches 72 are arranged in the equally divided circumference of the cylindrical portion to which the collimator lens C is adhered or on the surface side opposing the first notches 71. Note that FIG. 16A is a front view from the optical axis direction and FIG. 16B is a side sectional view.

Figure 18:
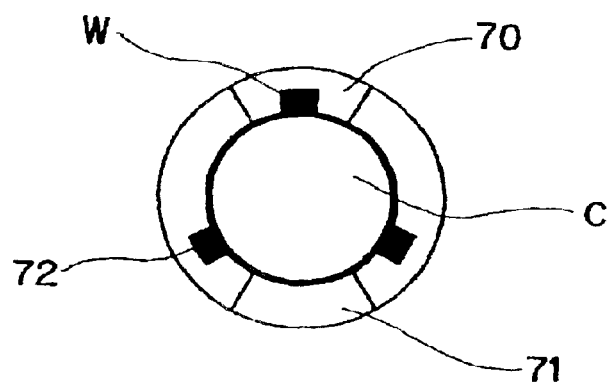
FIG. 18 is a front view from an optical axis direction showing another example of an adhesive part of a lens.

Although the second notches 72 are bored through the cylindrical portion in which the laser holder 10 holds the collimator lens C from the internal circumference surface to the external circumference surface, the second notches 72 may be formed in a recessed groove shape with a recess to be an adhesive portion provided on the internal surface as shown in FIG. 18.

Further, a slanting direction of a slanting taper portion is arbitrary in order to prevent adhesive from dropping on the external circumference of the cylindrical portion and make pouring-in and stability of adhesive effective.

Figure 16B:
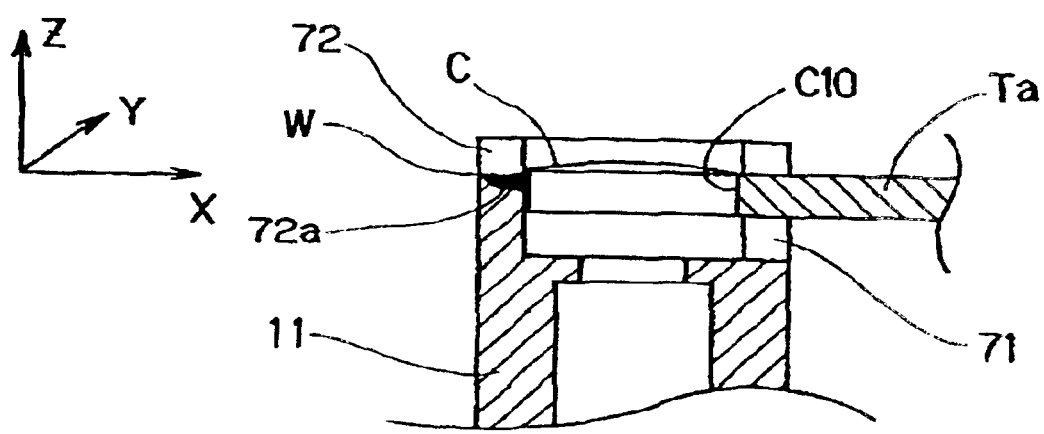

As shown in FIG. 16B, if the taper portion 72a of the second notch 72 is formed in a taper shape slanting upward from the internal circumference surface to the external circumference surface of the cylindrical portion 11, an appropriate amount of adhesive is filled in the gaps in the engagement portion of the collimator lens C and the laser holder 10, whereby a stable application state of adhesive can be kept.

Figure 19:
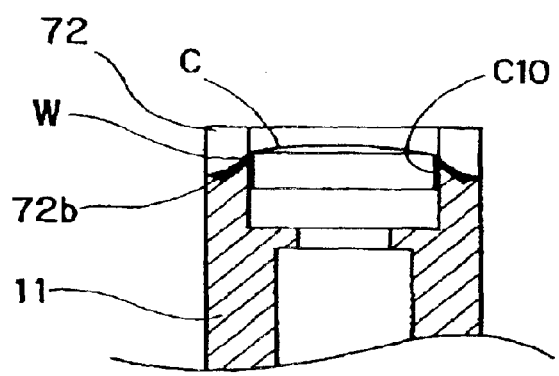
FIG. 19 is a side view showing another example of an adhesive part of a lens.

On the other hand, as shown in FIG. 19, if the taper portion 72a is formed in a taper shape slanting downward from the internal circumference surface to the external circumference surface of the cylindrical portion 11, adhesive is filled in the engagement portions and, at the same time, excessive adhesive on the external circumference surface C10 of the collimator lens C pours in the adhesive pooling portion 72b of the second notch 72, whereby excessive application of adhesive can be prevented.

Since the application state of adhesive can be stabilized according to the above description, it is possible to relax restrictions with respect to machine designing and optical designing such as forming a laser holder and a collimator lens in special shapes and requiring machining in order to improve reliability of fixing by an adhesive.

Figure 17A:
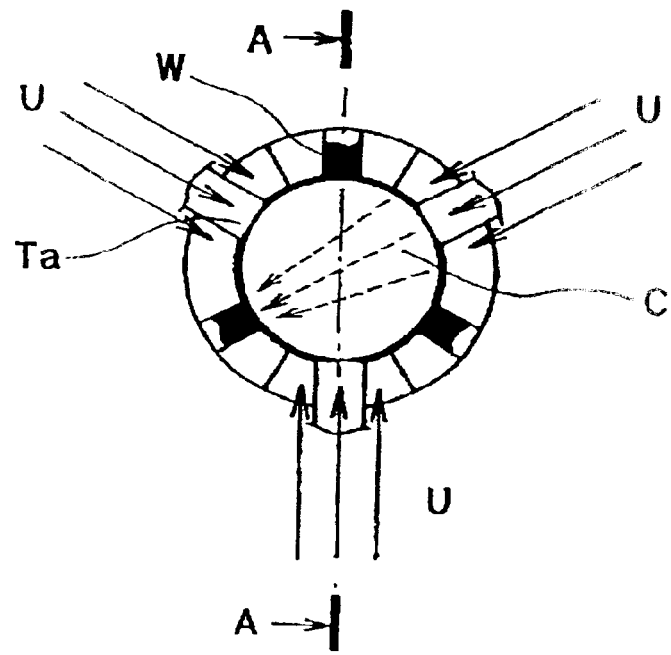
FIGS. 17A and 17B illustrate an adhesion process of a lens.
Figure 17B:
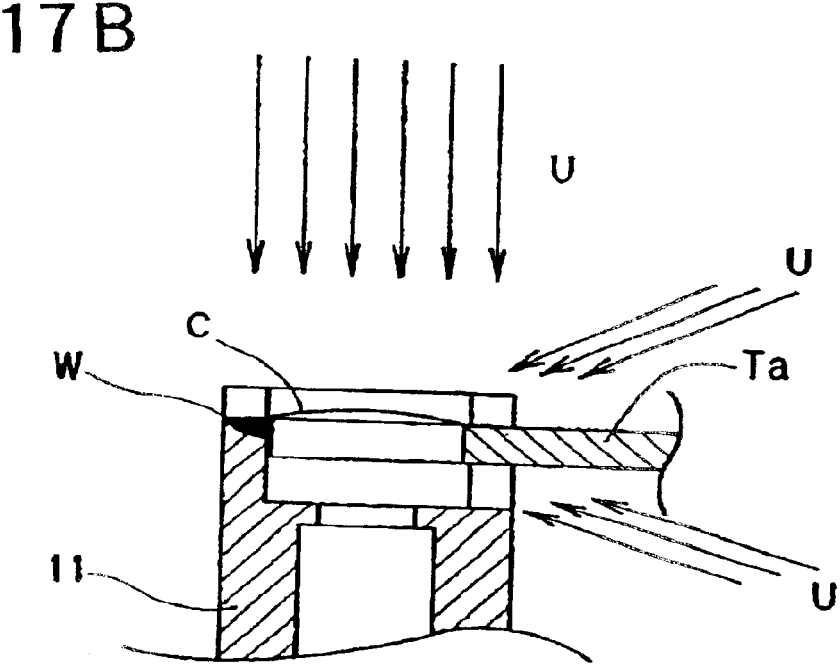

Next, as shown in FIGS. 17A and 17B, since the ultraviolet ray U for curing adhesive can be irradiated from the vertical direction of the laser holder 10 and the directions opposing the second notches 72 provided in the cylindrical portion 11 to which the collimator lens C is adhered, the number of adhesive portions and the part in an emitting direction can be set arbitrarily, whereby a degree of freedom of an adhesion process can be improved. Note that FIG. 17A is a front view from the optical axis direction and FIG. 17B is a side sectional view.

At this time, it is effective to give the collimator lens C a condensing effect so that ultraviolet ray incident on the arc portion of the collimator lens C irradiates the adhesive portion opposing the incident portion.

Note that it is more effective if the adhesive portions of the collimator lens C is made of a resin material that ultraviolet ray can transmit and the laser holder 10 is configured in two colors.

Furthermore, the adhesive portions of the collimator lens C equally divides deformation due to thermal expansion caused by irradiation of ultraviolet ray and, at the same time, is excellent in air permeability in the vicinity of the adhesive portions, prevents unreleased heat due to the adhesive and the laser holder 10 and is excellent in heat releasing property.

Thus, since the behavior of the collimator lens C due to curing reactive heat of adhesive and thermal expansion of the laser holder 10 can be suppressed to a minimum and optical performance can be stabilized in a short time by the first and the second notches 71 and 72 contacting air, adhesive fixing with high accuracy becomes possible.

Since the lens holding shown in FIGS. 16A and 16B is performed by the engagement portions of the second notches 72 and the protrusions 70 and the external circumference portion C10 of the collimator lens C to increase an area of adhesion and the lenses are held in the respective surfaces, adhesion strength is improved. Moreover, it is more effective if each adhesive surface is made rough.

Figure 20:
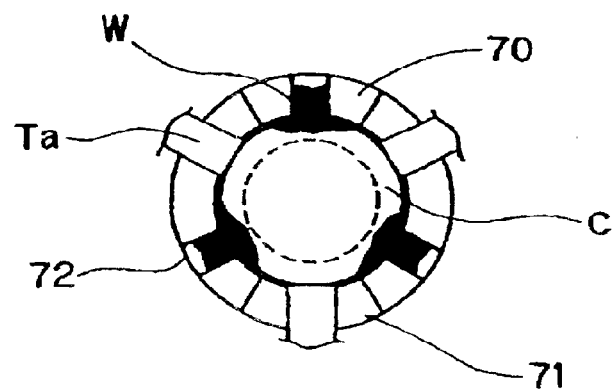
FIG. 20 is a front view from an optical axis direction showing another example of an adhesive part of a lens.

In FIGS. 15A, 15B, 16A and 16B, the adhesive portions of the collimator lens C are formed by the engagement portion of the external circumference surface of the collimator lens C and the cylindrical portion 11. If adhesive is applied on the emitting surface side on the outside of an effective radius (broken line part) to make that part an adhesive portion again after fixing by an adhesive the collimator lens once as shown in FIG. 20, adhesion strength can be enhanced while maintaining the position of the lens.

Then, since in the laser device configured as a unit, the protrusion 70 for holding the collimator lens C extends beyond the emitting surface side of the lens fixed by an adhesive as shown in FIGS. 15A and 15B, deterioration of the optical property caused by a worker or the like touching the lens and soiling its surface can be prevented.

Further, although the UV-curing type adhesive is used also in this embodiment, other photo-curing adhesive can be used as well.

In addition, according to this embodiment, uniformity of an adhesive layer is not deteriorated by the corner of the collimator lens C scraping out adhesive when the collimator lens C is inserted or adjusted to the axial direction. Thus, variation of the optical axis direction of the collimator lens C due to curing contraction of the adhesive and deviation of relative positions of a light source and the collimator lens C caused by external stress due to thermal expansion of the adhesive covering the collimator lens C from its both end surface caused by the atmospheric environment can be prevented. Further, deterioration of the optical performance can also be prevented.

Further, bubbles are prevented from entering inside the adhesion layer by preventing unevenness of adhesive in the adhesive part of the collimator lens C, where by detachment of the collimator lens C can be prevented.

Furthermore, the area of adhesion on the external circumference surface of the collimator lens may be narrowed by restrictions due to optical design or machining in the shape of the collimator lens C. However, even in this case, surer adhesion can be realized in which deviation of the position of the lens does not occur even if load due to environmental stress, vibration, impact or the like is applied.

As described above, in the present invention, since the adhesive part of the collimator lens C is not limited and adhesion in a plurality of parts is enabled and adhesive can be applied in a stable state, whereby adhesion strength is improved. As a result, assembling accuracy and reliability of lens adhesion can be improved.

Further, costs of assembling can be reduced by an increase of a degree of freedom of cramp tools, light irradiation and the like in the adhesion process.

Further, assembly and adjustment processes can be made easier and time required for the processes can be reduced, whereby reduced costs can be realized. Furthermore, adhesion becomes highly accurate and adhesion strength is improved, whereby a highly reliable laser device and method of adhering a collimator lens can be obtained.

Although the embodiments of the present invention have been described, the present invention is not limited to the above-mentioned embodiments and any modification is possible within the technical thought of the present invention.

What is claimed is:

1. A laser device comprising:
   a light source for emitting a laser beam;
   a lens through which the laser beam emitted from said light source is transmitted; and
   a holder having a tubular portion for holding said light source and said lens,
   wherein said tubular portion has a plurality of holding portions each holding said lens in a circumferential direction, and a plurality of notch portions each not holding said lens, and the holding portions and the notch portions are alternately provided in a circumferential direction of said tubular portion.

2. A laser device according to claim 1, wherein said lens is held in internal surfaces of said holding portions.

3. A laser device according to claim 1, wherein said holding portions hold said lens using adhesive that becomes hardened by illuminating a light.

4. A laser device according to claim 1, wherein said holding portions are arranged in the circumferential direction at even intervals.

5. A laser device according to claim 1, wherein said holding portions and said notch portions are provided by three or more odd numbers.

6. A laser device according to claim 1, wherein said notch portions are regions where a chuck for gripping said lens moves when relative position between said light source and said lens is adjusted.

7. A laser device according to claim 1, wherein depth in a generatrix direction of said tubular portion of said notch portions is larger than a thickness of said lens.

8. A laser device according to claim 1, wherein an edge in a generatrix direction of said tubular portion of said holding portions is projected from a surface of a side of said lens from which the laser beam is emitted.

9. A laser device according to claim 1, wherein a gap in a generatrix direction of said tubular portion exists between a bottom of said notch portions and a surface of a side of said lens to which the laser beam is injected.

10. A laser device according to claim 1, wherein each of said holding portions has a second notch portion to which adhesive for bonding said lens and said holding portions is poured.

11. A laser device according to claim 10, wherein depth in a generatrix direction of said tubular portion of said second notch portions is smaller than a depth of said notch portions.

12. A laser device according to claim 10, wherein a bottom of said second notch portions is tapered in a generatrix direction of said tubular portion.

13. A laser device according to claim 12, wherein the bottom of said second notch portions becomes lower from an outer surface of said tubular portion toward an internal surface of said tubular portion in accordance with the taper.

14. A laser device according to claim 12, wherein the bottom of said second notch portions become lower from an internal surface of said tubular portion toward an outer surface of said tubular portion in accordance with the taper.

15. A laser device according to claim 1, wherein said lens is a collimator lens for making the laser beam emitted from said light source a substantially parallel beam.

* * * * *

UNITED STATES PATENT AND TRADEMARK OFFICE
CERTIFICATE OF CORRECTION

PATENT NO. : 6,928,100 B2
DATED : August 9, 2005
INVENTOR(S) : Sato et al.

Figure 21:
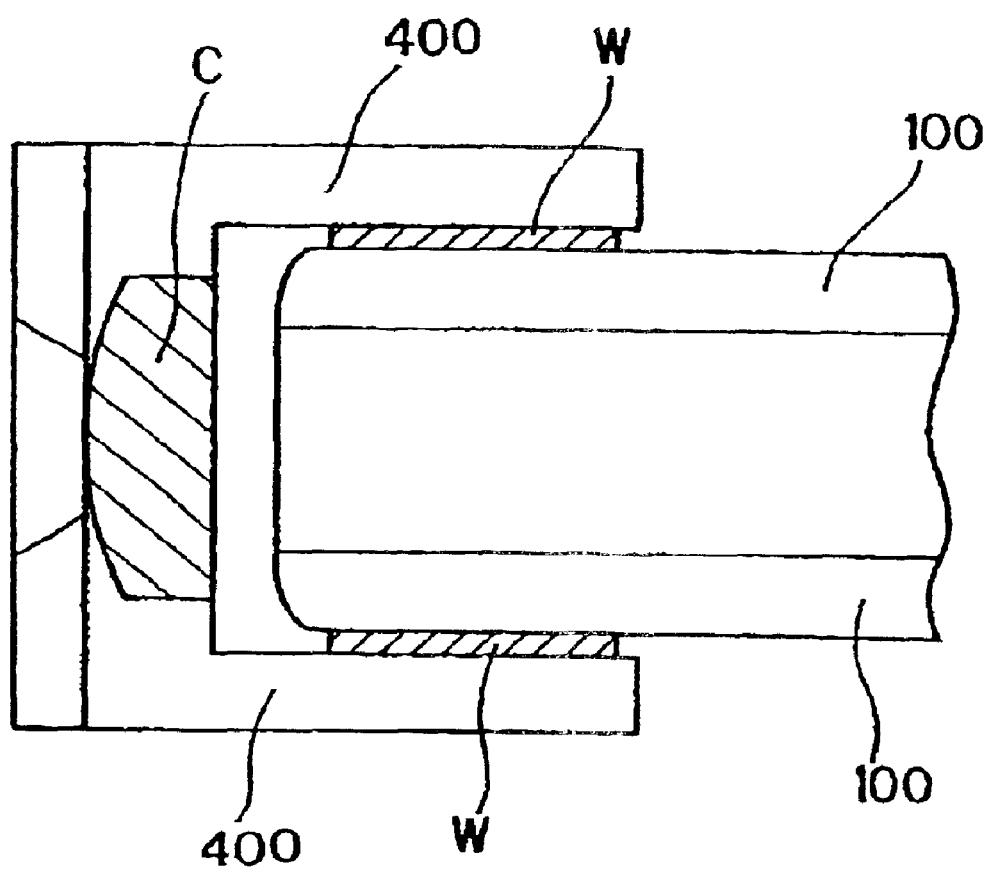
FIG. 21 is a view showing the periphery of a collimator lens of a conventional laser device.
Figure 22:
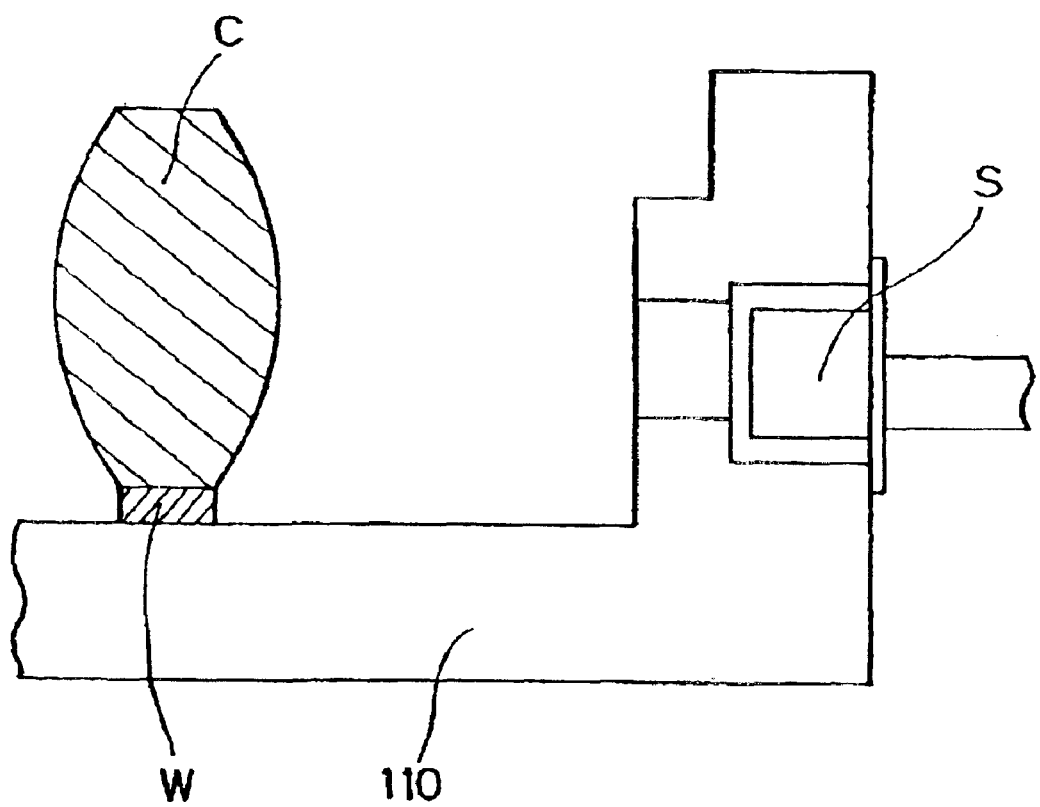
FIG. 22 is a view showing a conventional laser device.
Figure 21:
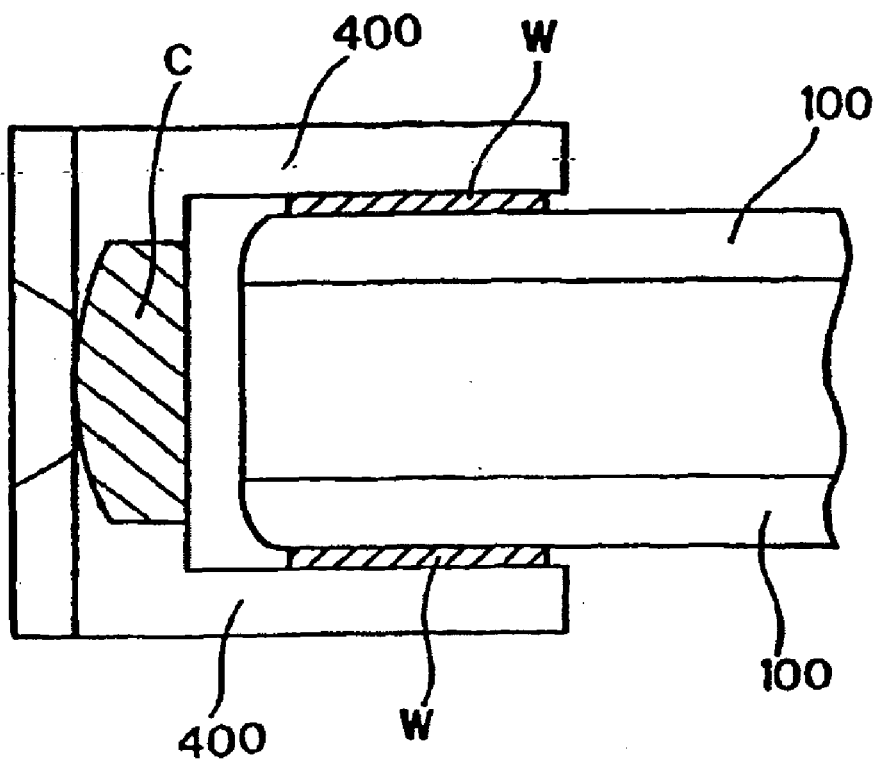
Figure 22:
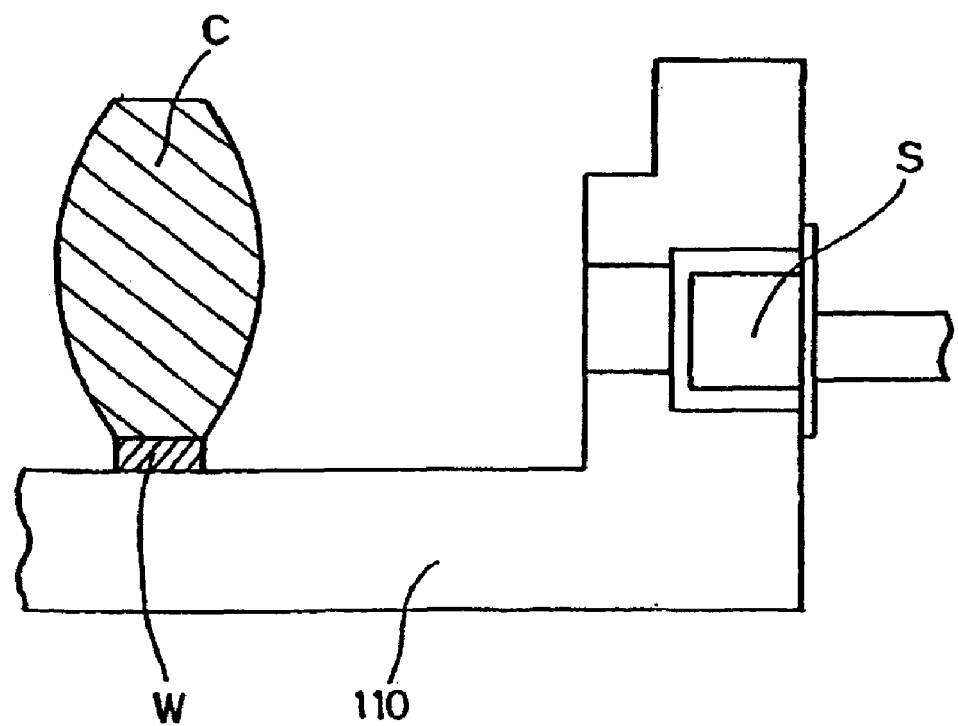

It is certified that error appears in the above-identified patent and that said Letters Patent is hereby corrected as shown below:

Drawings,
Replace Sheets 14 and 15 with the attached drawings.
Sheet 14, "Fig. 21" should read -- FIG. 21
                               Prior Art --; and
Sheet 15, "Fig. 22" should read -- FIG. 22
                               Prior Art --.

Column 6,
Line 2, "Tare" should read -- T are --.

Column 10,
Line 20, "where by" should read -- whereby --.

Signed and Sealed this

Fourteenth Day of February, 2006

JON W. DUDAS
*Director of the United States Patent and Trademark Office*